US010380117B2

(12) United States Patent
Takeda

(10) Patent No.: US 10,380,117 B2
(45) Date of Patent: Aug. 13, 2019

(54) EVENT OCCURRENCE PLACE ESTIMATION METHOD, COMPUTER-READABLE RECORDING MEDIUM STORING EVENT OCCURRENCE PLACE ESTIMATION PROGRAM, AND EVENT OCCURRENCE PLACE ESTIMATION APPARATUS

(71) Applicant: FUJITSU LIMITED, Kawasaki-shi, Kanagawa (JP)

(72) Inventor: Kunihiro Takeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 574 days.

(21) Appl. No.: 14/643,010

(22) Filed: Mar. 10, 2015

(65) Prior Publication Data

US 2015/0302019 A1 Oct. 22, 2015

(30) Foreign Application Priority Data

Apr. 18, 2014 (JP) .................................. 2014-086724

(51) Int. Cl.
*G06F 16/2455* (2019.01)
*G06F 16/242* (2019.01)
(Continued)

(52) U.S. Cl.
CPC ........ *G06F 16/24568* (2019.01); *G06F 16/24* (2019.01); *G06F 16/243* (2019.01);
(Continued)

(58) Field of Classification Search
CPC .................... G06F 17/3087; G06F 17/3053
See application file for complete search history.

(56) References Cited

U.S. PATENT DOCUMENTS 9,397,904 B2 * 7/2016 Berlingerio ........... G06F 16/951
2004/0267455 A1 * 12/2004 Hatano .............. G01C 21/3461
702/2
(Continued)

FOREIGN PATENT DOCUMENTS

| JP | 2013-50919 | 3/2013 |
| JP | 2013-235527 | 11/2013 |
| JP | 2014-6735 | 1/2014 |

*Primary Examiner* — Arpan P. Savla
*Assistant Examiner* — Soheila (Gina) Davanlou
(74) *Attorney, Agent, or Firm* — Xsensus LLP

(57) ABSTRACT

An event-occurrence-place estimation method having a process executed by a computer, the process includes acquiring a message of a predetermined event from social media to which a message is posted; extracting occurrence place information indicating an occurrence place of the predetermined event from the acquired messages; ranking the occurrence places in descending order according to the number of acquired messages corresponding to each of the pieces of occurrence place information, cumulating, for each of the occurrence places, the number of acquired messages of the occurrence place and the number of acquired messages of the occurrence places which are ranked higher than the occurrence place information, and identifying a change point where an increase rate of the cumulated number of the messages is an average increase ratio; and outputting the piece of occurrence place information identified by the identified change point.

10 Claims, 19 Drawing Sheets

(51) Int. Cl.
*G06F 16/245* (2019.01)
*G06F 16/955* (2019.01)
*G06F 16/29* (2019.01)
*G06F 16/24* (2019.01)

(52) U.S. Cl.
CPC .......... *G06F 16/245* (2019.01); *G06F 16/955* (2019.01); *G06F 16/29* (2019.01)

(56) References Cited

U.S. PATENT DOCUMENTS

| | | | | |
|---|---|---|---|---|
| 2008/0320095 | A1* | 12/2008 | Pearson | H04L 51/12 709/207 |
| 2012/0109901 | A1* | 5/2012 | Mase | G06F 17/30265 707/687 |
| 2013/0268348 | A1* | 10/2013 | Zhou | G06Q 30/0241 705/14.41 |
| 2014/0136527 | A1* | 5/2014 | Yoon | G06Q 50/01 707/723 |
| 2016/0277953 | A1* | 9/2016 | Andersson | H04L 41/5003 |

* cited by examiner

FIG. 3

| TIME | MESSAGE CONTENT |
|---|---|
| 08-13-2012 23:17:22 | OUR HOUSE IS IN OSAKA CITY. HOUSES 20 METERS AWAY FROM OUR HOUSE, LOCATED AT BIT LOWER LEVEL THAN OUR HOUSE, ARE HAVING UNDERFLOOR FLOODING. |
| 08-14-2012 00:47:27 | IN NEYAGAWA CITY, RIVER IS FLOODING BECAUSE OF HEAVY RAIN AND A ROAD IS SUBMERGED. |
| 08-14-2012 05:27:18 | MAYBE, EVACUATION ORDER WAS ISSUED IN HIRAKATA, TOO? |
| 08-14-2012 05:27:58 | IT LOOKS LIKE, IN OSAKA CITY, HOUSES ARE FLOODED IN SOME AREAS. http://xxx.co.jp |
| 08-14-2012 05:30:52 | RT@xxxx: HOUSE NEXT DOOR IS FLOODED. IS UJI CITY_OK? |
| ⋮ | |

FIG. 10A

| RANKING | MUNICIPALITY | NUMBER OF MESSAGE | CORRECT ANSWER |
|---|---|---|---|
| 1 | OSAKA CITY_OSAKA PREFECTURE | 398 | ★ |
| 2 | TAKATSUKI CITY_OSAKA PREFECTURE | 28 | ★ |
| 3 | HIRAKATA CITY_OSAKA PREFECTURE | 16 | |
| 4 | TOYONAKA CITY_OSAKA PREFECTURE | 13 | |
| 5 | IBARAKI CITY_OSAKA PREFECTURE | 12 | |
| 6 | MINOO CITY_OSAKA PREFECTURE | 11 | |
| 7 | MORIGUCHI CITY_OSAKA PREFECTURE | 8 | |
| 8 | SUITA CITY_OSAKA PREFECTURE | 8 | |
| 9 | IKEDA CITY_OSAKA PREFECTURE | 7 | |
| 10 | SHIMAMOTO TOWN_OSAKA PREFECTURE | 5 | |
| 11 | NEYAGAWA CITY_OSAKA PREFECTURE | 5 | |
| 12 | KATANO CITY_OSAKA PREFECTURE | 4 | |
| 13 | SETTU CITY_OSAKA PREFECTURE | 4 | |
| 14 | SAKAI CITY_OSAKA PREFECTURE | 4 | |
| 15 | KADOMA CITY_OSAKA PREFECTURE | 2 | |
| 16 | HIGASHIOSAKA CITY_OSAKA PREFECTURE | 2 | |
| 17 | KISHIWADA CITY_OSAKA PREFECTURE | 2 | |
| 18 | KAIZUKA CITY_OSAKA PREFECTURE | 2 | |
| 19 | SHIJONAWATE CITY_OSAKA PREFECTURE | 1 | |
| 20 | TOYONO TOWN_OSAKA PREFECTURE | 1 | |
| 21 | YAO CITY_OSAKA PREFECTURE | 1 | |
| 22 | IZUMIOOTSU CITY_OSAKA PREFECTURE | 1 | |
| 23 | NOSE TOWN_OSAKA PREFECTURE | 1 | |

FIG. 10C

|  | ACCURACY | RECALL RATIO | F VALUE |
|---|---|---|---|
| ESTIMATION RESULT OF EVENT OCCURRENCE PLACE ESTIMATION UNIT | 1.00 | 1.00 | 1.00 |
| (REFERENCE) ESTIMATION RESULT WHEN RANKS UP TO TOP FIVE ARE EXTRACTED | 0.40 | 1.00 | 0.57 |
| (REFERENCE) ESTIMATION RESULT WHEN CUMULATIVE COMPOSITION RATIO UP TO 80% IS EXTRACTED | 1.00 | 1.00 | 1.00 |

FIG. 11A

| RANKING | MUNICIPALITY | NUMBER OF MESSAGE | CORRECT ANSWER |
|---|---|---|---|
| 1 | OSAKA CITY_OSAKA PREFECTURE | 751 | ★ |
| 2 | MORIGUCHI CITY_OSAKA PREFECTURE | 141 | ★ |
| 3 | NEYAGAWA CITY_OSAKA PREFECTURE | 140 | ★ |
| 4 | HIRAKATA CITY_OSAKA PREFECTURE | 127 | |
| 5 | TAKATSUKI CITY_OSAKA PREFECTURE | 82 | ★ |
| 6 | SUITA CITY_OSAKA PREFECTURE | 52 | |
| 7 | TOYONAKA CITY_OSAKA PREFECTURE | 49 | |
| 8 | IBARAKI CITY_OSAKA PREFECTURE | 31 | |
| 9 | KATANO CITY_OSAKA PREFECTURE | 30 | |
| 10 | KADOMA CITY_OSAKA PREFECTURE | 27 | |
| 11 | DAITO CITY_OSAKA PREFECTURE | 23 | |
| 12 | IZUMISANO CITY_OSAKA PREFECTURE | 22 | |
| 13 | SAKAI CITY_OSAKA PREFECTURE | 20 | |
| 14 | MINOO CITY_OSAKA PREFECTURE | 20 | |
| 15 | KISHIWADA CITY_OSAKA PREFECTURE | 18 | |
| 16 | HIGASHIOSAKA CITY_OSAKA PREFECTURE | 17 | |
| 17 | SETTU CITY_OSAKA PREFECTURE | 16 | |
| 18 | YAO CITY_OSAKA PREFECTURE | 15 | |
| 19 | IKEDA CITY_OSAKA PREFECTURE | 14 | |
| 20 | SENNAN CITY_OSAKA PREFECTURE | 13 | |
| 21 | KAIZUKA CITY_OSAKA PREFECTURE | 11 | |
| 22 | TOYONO TOWN_OSAKA PREFECTURE | 10 | |
| 23 | SHIMAMOTO TOWN_OSAKA PREFECTURE | 10 | |
| 24 | SHIJONAWATE CITY_OSAKA PREFECTURE | 8 | |
| 25 | MISAKI TOWN_OSAKA PREFECTURE | 5 | |
| 26 | TADAOKA TWON, OSAKA PREFECTURE | 5 | |
| 27 | IZUMIOOTSU CITY_OSAKA PREFECTURE | 5 | |
| 28 | NOSE TOWN_OSAKA PREFECTURE | 3 | |
| 29 | HANNAN CITY_OSAKA PREFECTURE | 2 | |
| 30 | MATUBARA CITY_OSAKA PREFECTURE | 2 | |
| 31 | KASHIWARA CITY_OSAKA PREFECTURE | 2 | |
| 32 | TAJIRI TOWN_OSAKA PREFECTURE | 1 | |

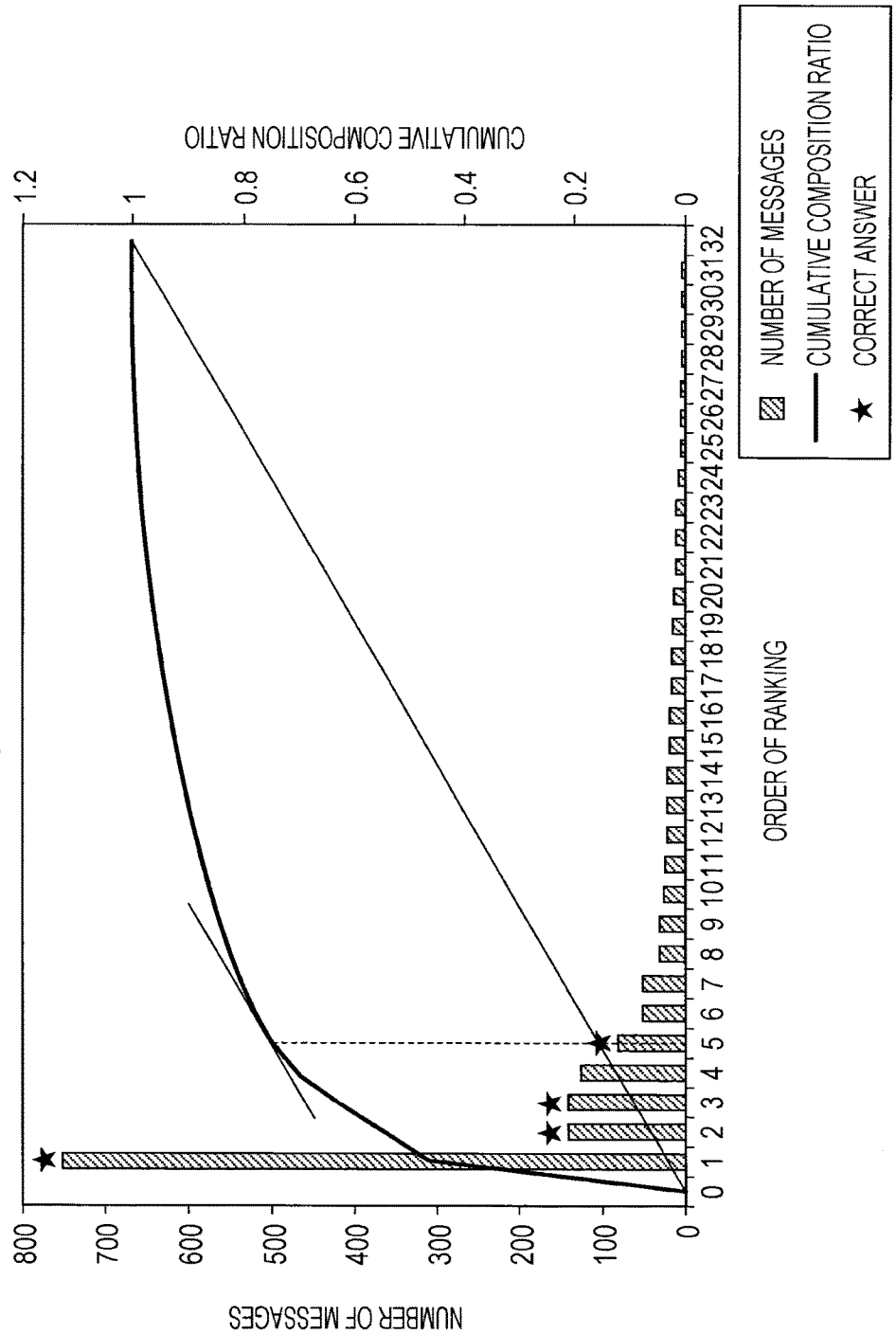

FIG. 11C

|  | ACCURACY | RECALL RATIO | F VALUE |
|---|---|---|---|
| ESTIMATION RESULT OF EVENT OCCURRENCE PLACE ESTIMATION UNIT | 0.80 | 1.00 | 0.88 |
| (REFERENCE) ESTIMATION RESULT WHEN RANKS UP TO TOP FIVE ARE EXTRACTED | 0.80 | 1.00 | 0.88 |
| (REFERENCE) ESTIMATION RESULT WHEN CUMULATIVE COMPOSITION RATIO UP TO 80% IS EXTRACTED | 0.57 | 1.00 | 0.72 |

EVENT OCCURRENCE PLACE ESTIMATION METHOD, COMPUTER-READABLE RECORDING MEDIUM STORING EVENT OCCURRENCE PLACE ESTIMATION PROGRAM, AND EVENT OCCURRENCE PLACE ESTIMATION APPARATUS

CROSS-REFERENCE TO RELATED APPLICATION

This application is based upon and claims the benefit of priority of the prior Japanese Patent Application No. 2014-086724, filed on Apr. 18, 2014, the entire contents of which are incorporated herein by reference.

FIELD

The embodiments discussed herein are related to an event occurrence place estimation method, a computer-readable recording medium storing event occurrence place estimation program, and an event occurrence place estimation apparatus.

BACKGROUND

At scenes of disaster management, when a disaster occurs, it is important to instantaneously catch a disaster occurrence place. However, it is difficult to set a physical sensor that catches a disaster event in every single place where there is a risk of occurrence of a disaster. Thus, it is examined to use disaster witness reports through social media as "sensors by human". The social media in this connection is media used by users for positing and exchanging messages on line and thereby performing information distribution. Examples of social media include Twitter (a registered trademark of Twitter, Inc.), Facebook (a registered trademark of Facebook, Inc.), and the like. For example, there is a technique in which a message related to a disaster is extracted from social media to extract information related to a disaster occurrence place.

Related art is described in, for example, Japanese Laid-open Patent Publication No. 2014-6735, Japanese Laid-open Patent Publication No. 2013-50919, and Japanese Laid-open Patent Publication No. 2013-235527.

SUMMARY

According to an aspect of the invention, an event occurrence place estimation method having a process executed by a computer, the process includes acquiring a message related to a predetermined event from social media to which a message is posted; extracting a piece of occurrence place information indicating an occurrence place of the predetermined event from the acquired messages; ranking the occurrence places in descending order according to the number of acquired messages corresponding to each of the pieces of occurrence place information, cumulating, for each of the occurrence places, the number of acquired messages associated with the occurrence place and the number of acquired messages associated with the occurrence places which are ranked higher than the occurrence place, and identifying a change point where an increase rate of the cumulated number of the messages is an average increase ratio; and outputting the piece of occurrence place information identified by the identified change point.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of messages posted to a social media service;

FIG. 10A is a table illustrating an example of results of ranking flooding and submerging occurrence places, which were extracted from messages, in descending order of the number of messages;

FIG. 10C is a table illustrating an example of evaluation results for accuracy of estimation of flooding and submerging occurrence places;

FIG. 11A is a table illustrating an example of results of ranking flooding and submerging occurrence places, which were extracted from messages, in descending order of the number of messages;

FIG. 11B is a graph illustrating the number of messages of each occurrence place and an example of a cumulative composition ratio curve;

FIG. 11C is a table illustrating an example of evaluation results for accuracy of estimation of flooding and submerging occurrence places;

DESCRIPTION OF EMBODIMENTS

When the above-described technique in the background is used, disaster occurrence place candidates may be extracted. However, disaster occurrence place candidates that are extracted from social media include a correct answer and a wrong answer, and a disaster occurrence place is not accurately estimated.

The number of disaster occurrence places differs depending on the size of a disaster occurrence range. Thus, for example, a case is assumed where disaster occurrence place candidates are ranked in descending order of the number of messages and candidates of a predetermined number of the top ranks are extracted as disaster occurrence places. In this case, there are cases where all of disaster occurrence places are not extracted. Also, there are cases where a place where a disaster has not actually occurred is extracted. For example, a case is assumed where the number of messages are tallied for disaster occurrence place candidates in ranking order and then a cumulative composition ratio relative to the number of all messages is obtained to extract disaster occurrence places for which the cumulative composition ratio is up to a predetermined value. Also, in this case, there are cases where all of disaster occurrence places are not extracted. There are also cases where a place where a disaster has not actually occurred is extracted.

Note that the above-described problems are not limited to estimation of disaster occurrence places, and may occur generally when an event occurrence place where an event has occurred is estimated from social media.

In one aspect, it is desired to provide an event occurrence place estimation method, a computer-readable recording medium storing event occurrence place estimation program, and an event occurrence place estimation apparatus, which enable highly accurate estimation of an event occurrence place.

Hereinafter, embodiments of an event occurrence place estimation method, an event occurrence place estimation program, and an event occurrence place estimation apparatus according to the present disclosure will be described in detail with reference to the accompanying drawings. Note that the present disclosure is not limited by the following embodiments. Each of embodiments may be combined, as appropriate, to the extent that there is no contradiction.

First Embodiment

[Configuration of System]

Figure 1:
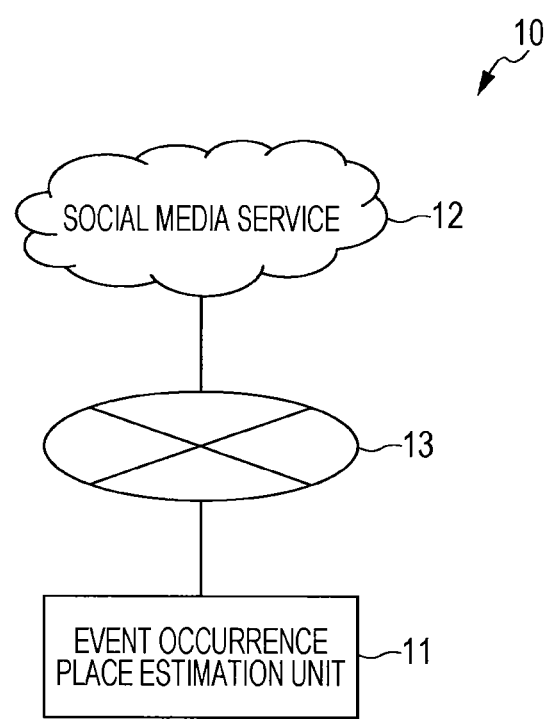
FIG. 1 is a diagram illustrating an example of a schematic configuration of an entire system including an event occurrence place estimation apparatus.

A system according to a first embodiment will be described. FIG. 1 is a diagram illustrating an example of a schematic configuration of an entire system including an event occurrence place estimation apparatus. As illustrated in FIG. 1, a system 10 includes an event occurrence place estimation apparatus 11 and a social media service 12. The event occurrence place estimation apparatus 11 and the social media service 12 are coupled to each other via a network 13 so as to be able to communicate with each other, and are enabled to exchange various types of information. As an example of the network 13, whether wired or wireless, a mobile communication, such as a mobile phone, and the like, or a communication network of any kind, such as the Internet, a local area network (LAN), a virtual private network (VPN), and the like, may be employed.

The social media service 12 is a cloud system that provides a social media service in which users post and exchange messages to perform information distribution. The social media service 12 may be implemented by a single computer, or may be implemented by a plurality of computers. Examples of the social media service 12 include Twitter, Facebook, and the like.

The event occurrence place estimation apparatus 11 is an apparatus that estimates an occurrence place where a predetermined event has occurred from messages posted to the social media service 12. The event occurrence place estimation apparatus 11 is, for example, a computer, such as a personal computer, a server computer, and the like. The event occurrence place estimation apparatus 11 may be implemented as a single computer, and may be implemented as a cloud realized by a plurality of computers. Note that, in this embodiment, an example where the event occurrence place estimation apparatus 11 is a single computer will be described. Also, in this embodiment, an example where the predetermined event is a disaster and an occurrence place where the disaster has occurred is estimated will be described.

[Configuration of Event Occurrence Place Estimation Apparatus]

Figure 2:
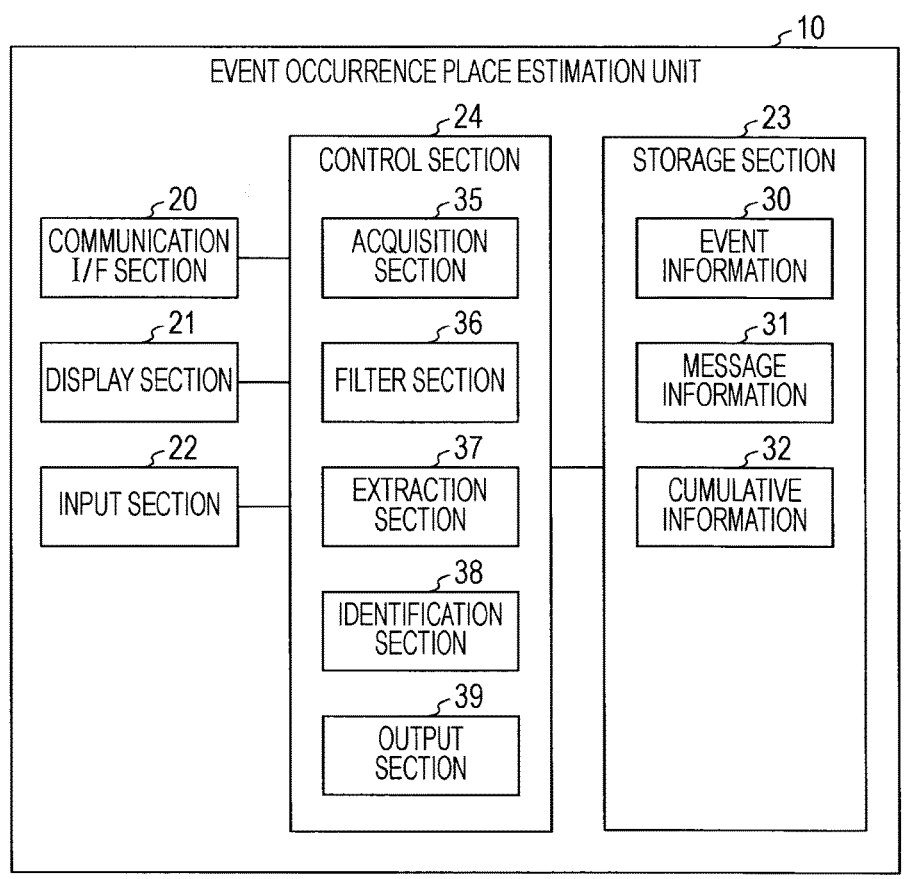
FIG. 2 is a diagram illustrating an example of a functional configuration of an event occurrence place estimation apparatus.

Next, a configuration of the event occurrence place estimation apparatus 11 according to this embodiment will be described. FIG. 2 is a diagram illustrating an example of a functional configuration of an event occurrence place estimation apparatus. As illustrated in FIG. 2, the event occurrence place estimation apparatus 11 includes a communication interface (I/F) section 20, a display section 21, an input section 22, a storage section 23, and a control section 24. The event occurrence place estimation apparatus 11 may include, in addition to the functional sections illustrated in FIG. 2, various types of known functional sections.

The communication I/F section 20 is an interface that performs communication control with another apparatus. The communication I/F section 20 transmits and receives various types of information with another apparatus via the network 13. For example, the communication I/F section 20 receives information related to a posted message from the social media service 12. As the communication I/F section 20, a network interface card, such as a LAN card, and the like, may be used.

The display section 21 is a display device that displays various types of information. As the display section 21, a display device, such as a liquid crystal display (LCD), a cathode ray tube (CRT), and the like, may be used. The display section 21 displays various types of information. For example, the display section 21 displays various types of screens, such as a screen of an estimation result of an occurrence place where an event has occurred.

The input section 22 is an input device that inputs various types of information. As the input section 22, an input device that receives input of an operation of a mouse, a keyboard, or the like, may be used. The input section 22 receives input of various types of information. For example, the input section 22 receives input of various types of settings and various types of operations which are related to estimation of an occurrence place where an event has occurred. The input section 22 receives operation input from a user, and inputs operation information indicating received operation contents to the control section 24.

The storage section 23 is a storage device that stores various types of data. For example, the storage section 23 is a storage device, such as a hard disk, a solid state drive (SSD), an optical disk, and the like. Note that the storage section 23 may be a semiconductor memory, such as a random access memory (RAM), a flash memory, a non-volatile static random access memory (NVSRAM), and the like, in which data may be rewritten.

The storage section 23 stores an operating system (OS) and various types of programs, which are executed by the control section 24. For example, the storage section 23 stores various types of programs including a program that executes estimation processing that will be described later. Furthermore, the storage section 23 stores various types of data used by a program executed by the control section 24.

For example, the storage section 23 stores event information 30, message information 31, and cumulative information 32.

The event information 30 is data that stores information related to an event that is a target of occurrence place estimation. For example, a keyword related to an event is stored in the event information 30. In this embodiment, a message including the keyword stored in the event information 30 is extracted from the social media service 12. For example, when an occurrence place of a flood disaster, such as flooding, submerging, and the like, is estimated as an event, "flooding" and "submerging" as keywords related to a flooding disaster are stored in the event information 30. A keyword that is stored in the event information 30 is set in accordance with an event that is a target of occurrence place estimation. Note that the event information 30 may be configured such that addition, change, and deletion of a keyword are externally performed even after setting has been performed.

The message information 31 is data that stores a message related to an event acquired from the social media service 12. A message that is acquired will be described in detail later.

The cumulative information 32 is data that stores information related to a cumulative total value of the number of messages for each event occurrence place. A cumulative total value of the number of messages for each event occurrence place will be described in detail later.

The control section 24 is a device that controls the event occurrence place estimation apparatus 11. As the control section 24, an electronic circuit, such as a central processing unit (CPU), a micro processing unit (MPU), and the like, or an integrated circuit, such as an application specific integrated circuit (ASIC), a field programmable gate array (FPGA), and the like, may be used. The control section 24 includes an internal memory that stores a program in which processing steps of various types are defined and control data, and executes various types of processing using the program or the control data. Various types of programs are operated, and thus, the control section 24 functions as various types of processing sections. For example, the control section 24 includes an acquisition section 35, a filter section 36, an extraction section 37, an identification section 38, and an output section 39.

The acquisition section 35 performs various types of acquisition. For example, the acquisition section 35 acquires a posted message from the social media service 12. Note that the social media service 12 may transmit a message as needed and also may transmit a message when receiving a request from the event occurrence place estimation apparatus 11. Also, the social media service 12 may transmit all of posted messages, and may selectively transmit only a message related to a specific event. For example, the acquisition section 35 may transmit a keyword stored in the event information 30 to the social media service 21 and the social media service 12 may selectively transmit only a message including the keyword to the event occurrence place estimation apparatus 11.

The filter section 36 performs various types of filter processing. For example, the filter section 36 performs filter processing of excluding a message that is not used from messages acquired by the acquisition section 35. For example, when the social media service 12 transmits all of posted messages to the apparatus 11, the filter section 36 performs filter processing of excluding a message that does not include a keyword stored in the event information 30 from acquired messages.

When estimating an event occurrence place, the filter section 36 performs filter processing of excluding a message that is to be noise or unnecessary for an event occurrence place estimation. For example, the filter section 36 performs filter processing of excluding a message posted by a media organization, a reposted message, and a presumptive message from acquired messages. For example, when a message includes information of a posting source and the posting source is a media organization, the filter section 36 excludes the message. Also, when a message is a reposted message, the filter section 36 excludes the message. For example, in a twitter, a reposted message includes "RT" indicating a retweeted message. When a message is a retweeted message, the filter section 36 excludes the message. When a message is a presumptive message, the filter section 36 excludes the message. For example, when a message includes a specific word included in presumptive contents, the filter section 36 excludes the message. The specific word may be set by an administrator. The specific word may be also obtained by performing machine learning on collected messages of presumptive contents. The filter section 36 may syntactically analyze a message and, when a message is determined to include a syntax used in presumptive contents, the filter section 36 may exclude the message. A syntax used in presumptive contents may be acquired, for example, by performing machine learning on collected messages of presumptive contents. In this embodiment, a case where all of a message posted by a media organization, a reposted message, and a presumptive message are excluded from acquired messages will be described, but filter processing of excluding one or two types of the above-described messages may be performed. A message that has not been excluded by filter processing is stored in the message information 31.

The extraction section 37 performs various types of extraction. For example, the extraction section 37 extracts information of an event occurrence place from messages that have not been excluded by the filter section 36. For example, the extraction section 37 extracts a noun, such as a place name, and the like, which indicates a place, from a message. For example, place information in which a noun, such as a place name, and the like, which indicates a place, has been registered in advance is stored in the storage section 23 and, when information of a place, such as a place name, registered in the place information, is included in a message, the extraction section 37 extracts information of the place from the message. Note that, when a monitoring target range in which the occurrence of an event is monitored is defined, the extraction section 37 may extract only a noun indicating a place in the monitoring target range. In this case, only a place in the monitoring target range may be registered in the place information or a flag may be given to a place in the monitoring target range and the place may be thus registered. Also, a noun that indicates a place that is a monitoring target may be registered as a monitoring target in the place information in advance, and the extraction section 37 may extract only the noun of the monitoring target. For example, when an occurrence place where an event, such as a flooding of a river, and the like, has occurred is estimated, as nouns of monitoring targets, the name of a river and the names of surrounding towns and cities through which the river runs may be registered as nouns of monitoring targets in advance, and the extraction section 37 may extract a registered noun of a monitoring target. Note that the extraction section 37 may extract a noun, such as a place name, and the like, included in a message, which indicates a place, as it is, and may extract information of a place related to a noun included in a message, which indicates a place. For example, the name of a town and the name of a municipality including the name of the town may be registered in the place information in association with each other in advance, and the extraction section 37 may extract the name of a municipality corresponding to the name of a town included in a message, based on the place information.

The identification section 38 performs various types of identification. For example, the identification section 38 identifies information that is a threshold when an event occurrence place is extracted from posted contents of the social media service 12. For example, the identification section 38 ranks occurrence places extracted by the extraction section 37 in descending order of the number of messages. Then, the identification section 38 cumulates the number of messages of each occurrence place in ranking order, and identifies a change point where the increase rate of the cumulated number of messages is an average increase rate. For example, the identification section 38 cumulates the number of messages of each occurrence place in ranking order, and obtains a cumulative composition ratio curve for all of messages from which event occurrence places have been extracted. The identification section 38 identifies a change point where the change rate of the cumulative composition ratio curve is an average increase rate of the cumulative composition ratio curve.

The output section 39 outputs various types of output. For example, the output section 39 outputs an occurrence place, based on a change point identified by the identification section 38. For example, the output section 39 outputs, as an occurrence place where an event has occurred, an occurrence place ranked in higher than the position of the identified change point in a cumulative composition ratio curve. For example, the output section 39 outputs each occurrence place to the display section 21 in ranking order, and outputs an occurrence place ranked higher than the position of the change point to the display section 21 such that the occurrence place may be identified. Note that, in this embodiment, an occurrence place ranked higher than the position of the change point is output as an occurrence place where an event has occurred, but the lower limit for output may be changed using the position of the change point as a reference. For example, the output section 39 may output, as an occurrence place where an event has occurred, an occurrence place ranked higher than the ranking order which is lower or higher than the position of the change point by a predetermined number. For example, the output section 39 may output, as an occurrence place where an event has occurred, an occurrence place ranked higher than the order lower than the position of the change point by one.

Now, a specific example will be described. FIG. 3 is a diagram illustrating an example of messages posted in a social media service. In this case, an example where a place where a flooding disaster, such as a flooding or submerging, and the like, has occurred is estimated from posted messages will be described.

FIG. 3 illustrates massages posted when a flooding disaster, such as a flooding or submerging, and the like, was occurring. In the example of FIG. 3, a message saying, "Our house is in Osaka City. Houses 20 meters away from our house, located at bit lower level than our house, are having underfloor flooding." was posted at Aug. 13, 2012 23:17:22. Also, in the example of FIG. 3, a message saying, "In Neyagawa City, a river is flooding because of heavy rain and a road is submerged." was posted at Aug. 14, 2012 00:47:27. Also, in the example of FIG. 3, a message saying, "Maybe, an evacuation order was issued in Hirakata, too?" was posted at Aug. 14, 2012 05:27:18. Also, in the example of FIG. 3, a message saying, "It looks like, in Osaka City, houses are flooded in some areas. http://xxx.co.jp" was posted at Aug. 14, 2012 05:27:58. Assume that this "http://xxx.co.jp" is an address indicating a posting source and is the address of a media organization, such as a newspaper company. Furthermore, in the example of FIG. 3, a message saying, "RT@xxxx: House next door is flooded. Is Uji City OK?" was posted at Aug. 14, 2012 05:30:52. This "RT@xxxx" indicates that this message is a reposted message, and also indicates that the posting source is xxxx.

When an occurrence place related to a flooding disaster is estimated from posted contents of the social media service 12, the acquisition section 35 acquires messages illustrated in FIG. 3 from the social media service 12.

The filter section 36 performs filter processing of excluding a message that does not include a keyword stored in the event information 30 from received messages. For example, when an occurrence place related to a flooding disaster is estimated, the filter section 36 performs filtering processing of excluding a message that does not include a keyword, such as a "flooding" or "submerging". In the example of FIG. 3, each of the messages includes a keyword, such as "flooding" and "submerging", and therefore, the messages are not excluded. Thus, noise in estimating a flooding disaster occurrence place may be excluded, and processing loads may be reduced.

The filter section 36 performs filter processing of excluding a message posted by a media organization, a reposted message, and a presumptive message from acquired messages. For example, in the example of FIG. 3, "It looks like, in Osaka City, houses are flooded in some areas. http://xxx.co.jp" is a message posted by a media organization, and therefore, is excluded. Also, "RT@xxxx: House next door is flooded. Is Uji City OK?" is a reposted message, and therefore, is excluded. Also, "Maybe, an evacuation order was issued in Hirakata, too?" is a message including a specific presumptive word, that is, "maybe", and therefore, is excluded.

In this case, a message posted by a media organization is cited by many users. Therefore, when ranking of disaster occurrence places is performed using also messages posted by media organizations, the influence of messages posted by media organizations increases, and thus, an occurrence place is not estimated with high accuracy. Therefore, in this embodiment, a message posted by a media organization is excluded.

A reposted message is also cited by many users by spreading of the reposted message. Therefore, when reposted messages are included, disaster occurrence places of the reposted messages are ranked high, although each user has not actually seen an occurrence place, and an actual disaster occurrence place is not estimated with high accuracy. Therefore, in this embodiment, a reposted message is excluded.

A presumptive message is not posted by a user, who saw a disaster place. Therefore, using a presumptive message, an occurrence place is not estimated with high accuracy. Therefore, in this embodiment, a presumptive message is excluded.

The extraction section 37 extracts a noun indicating a place from the remaining messages that have not been excluded by the filter section 36. For example, in the example of FIG. 3, the extraction section 37 extracts "Osaka City" from the message saying, "Our house is in Osaka City. Houses 20 meters away from our house, located at bit lower level than our house, are having underfloor flooding." Also, the extraction section 37 extracts "Neyagawa City" from the message saying, "In Neyagawa City, a river is flooding because of heavy rain and a road is submerged."

The identification section 38 ranks occurrence places extracted by the extraction section 37 in descending order of the number of messages. Then, the identification section 38 cumulates the number of messages of each occurrence place in ranking order and obtains a cumulative composition ratio curve for all of messages.

Figure 4:
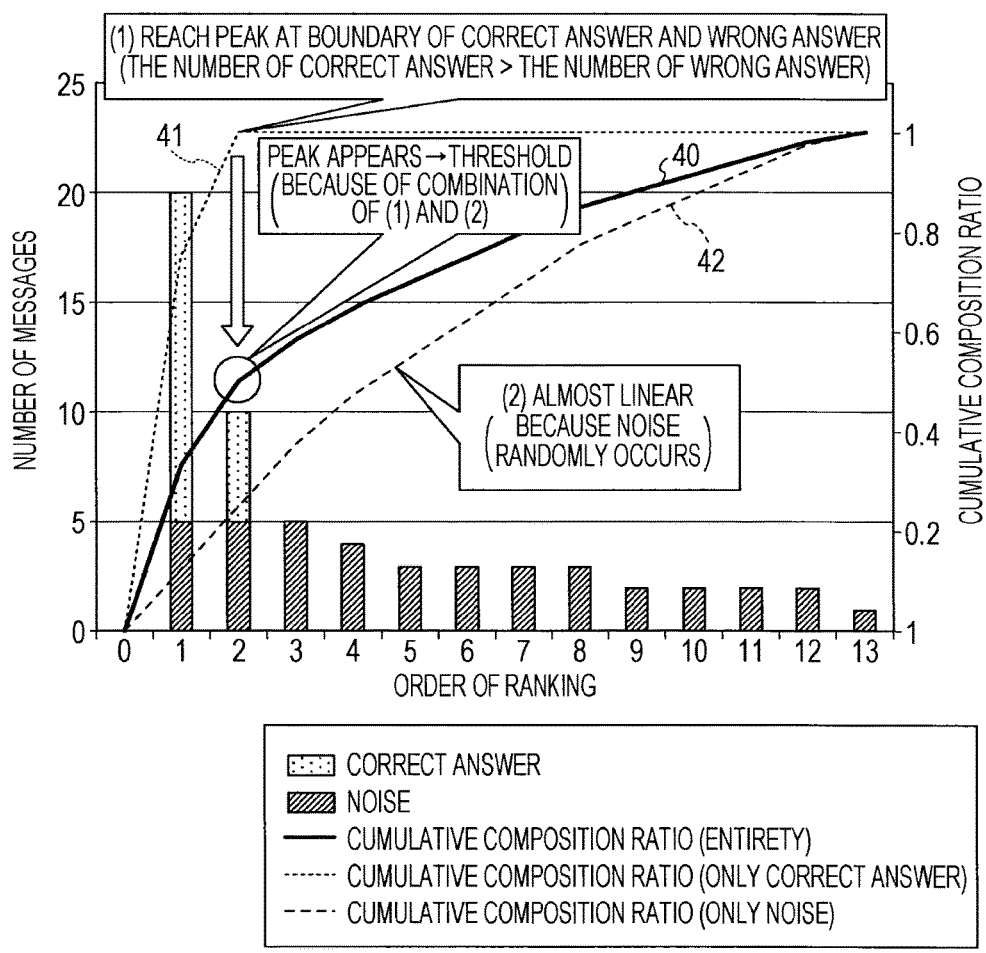
FIG. 4 is a graph illustrating an example of a cumulative composition ratio curve.

FIG. 4 is a graph illustrating an example of a cumulative composition ratio curve. In the example of FIG. 4, for all of messages, that is, the total of messages of the occurrence places of the first to thirteenth ranks, the number of messages of each of occurrence places of the first to thirteenth ranks is indicated by a graph. For example, for the first rank, the number of messages is 20. A cumulative composition ratio curve 40 is a curve obtained by cumulating the composition ratio of each occurrence place in raking order.

In this case, a message includes noise that is not excluded by filter processing performed by the filter section 36. For example, there are cases where a user posts a massage including a wrong place name by mistake. Also, there are cases where, when the same name place name is used in a plurality of different places, a different place is extracted as a disaster occurrence place. Such a message is noise. That is, there are messages which include an occurrence place where a disaster actually has occurred, and massages which include a place where a disaster has not actually occurred. A place where a disaster has not actually occurred is noise when a disaster occurrence place is estimated.

When disaster occurrence places extracted from messages are ranked in descending order of the number of messages, many messages are posted for an occurrence place where a disaster has actually occurred, and thus, the occurrence place is ranked high. On the other hand, a place where a disaster has not actually occurred is ranked low.

Figure 5:
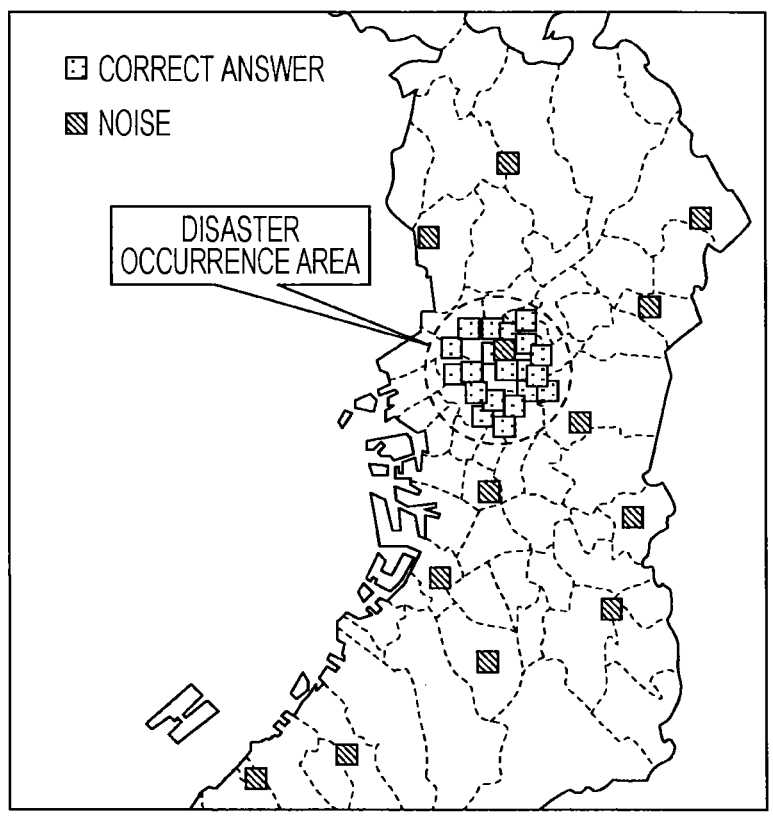
FIG. 5 is a diagram illustrating a map on which occurrence places included in messages when a disaster occurs are indicated.

FIG. 5 is a diagram illustrating a map on which occurrence places included in messages when a disaster has occurred are indicated. In the example of FIG. 5, a disaster occurrence area where a disaster has occurred is surrounded by a dashed line. In the example of FIG. 5, when an occurrence place is in the disaster occurrence area, the occurrence place is indicated as a correct answer, and when an occurrence place is outside the disaster occurrence, the occurrence place is indicated as noise. When a disaster occurs, many messages related to the disaster are posted in a disaster occurrence area. Therefore, many correct answers concentrate in the disaster occurrence area. On the other hand, uniformly, noise occurs at random.

In FIG. 4, a part indicating the number of messages of correct answer and a part indicating the number of messages of noise are separately illustrated in a graph of the number of messages of each occurrence place. Also, in FIG. 4, a cumulative composition ratio curve 41 of only correct answers, obtained by cumulating the composition ratio of the number of messages of correct answers for each occurrence place to the total number of messages of correct answers. Also, in FIG. 4, a cumulative composition ratio curve 42 of only noise, obtained by cumulating the composition ratio of the number of messages of noise for each occurrence place to the total number of messages of noise is illustrated. As described above, uniformly, noise occurs at random. Therefore, the cumulative composition ratio curve 42 is a linear line that substantially uniformly increases. On the other hand, the cumulative composition ratio curve 41 indicates a drastic increase at occurrence places where a disaster has actually occurred. In the example of FIG. 4, the occurrence places of the first and second ranks are correct answers, and therefore, the cumulative composition ratio curve 41 indicates drastic increase at the first and second ranks.

The cumulative composition ratio curve 40 is a combination of the cumulative composition ratio curve 41 of only correct answers and the cumulative composition ratio curve 42 of only noise. Thus, the cumulative composition ratio curve 40 greatly increases at an occurrence place of correct answer where a disaster has actually occurred, and the increase rapidly reduces at the boundary of correct answer and noise. Thus, when a straight line connecting a start point and an end point of the cumulative composition ratio curve 40 is used as a reference, the cumulative composition ratio curve 40 reaches a peak between the correct answer and the wrong answer.

Figure 6:
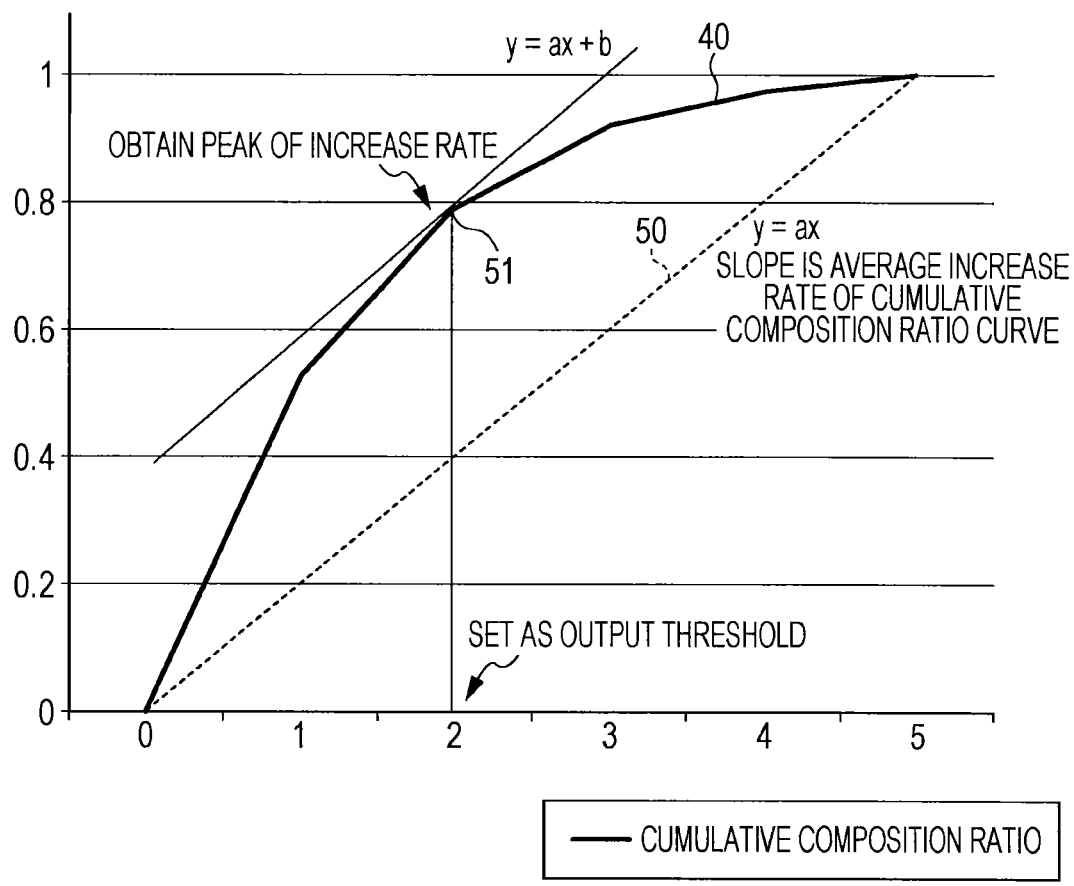
FIG. 6 is a graph illustrating a flow of identifying a change point from a cumulative composition ratio curve.

The identification section 38 identifies a change point where a change ratio of a cumulative composition ratio curve is an average increase rate of the cumulative composition ratio curve. FIG. 6 is a graph illustrating a flow of identifying a change point from a cumulative composition ratio curve. For example, as illustrated in FIG. 6, the identification section 38 obtains a straight line 50 connecting a starting point and an end point of the cumulative composition ratio curve 40. The slope of the straight line 50 is an average increase rate of the cumulative composition ratio curve 40. Then, the identification section 38 identifies a change point 51 that is a peak of the cumulative composition ratio curve 40 when the straight line 50 is used as a reference. For example, the identification section 38 translates the straight line 50 to identify the change point 51 that is a tangent point thereof with the cumulative composition ratio curve 40. Note that the identification section 38 may obtain an inflection point that is a peak by rotating the cumulative composition ratio curve 40 such that the straight line 50 is an axis in the lateral direction, thereby obtaining the change point 51.

The output section 39 outputs, as an occurrence place where an event has occurred, an occurrence place ranked higher than the position of the change point identified by the identification section 38. In the example of FIG. 6, the output section 39 outputs the occurrence places of the first and second ranks, which are ranked higher than the position of the change point 51.

Figure 7:
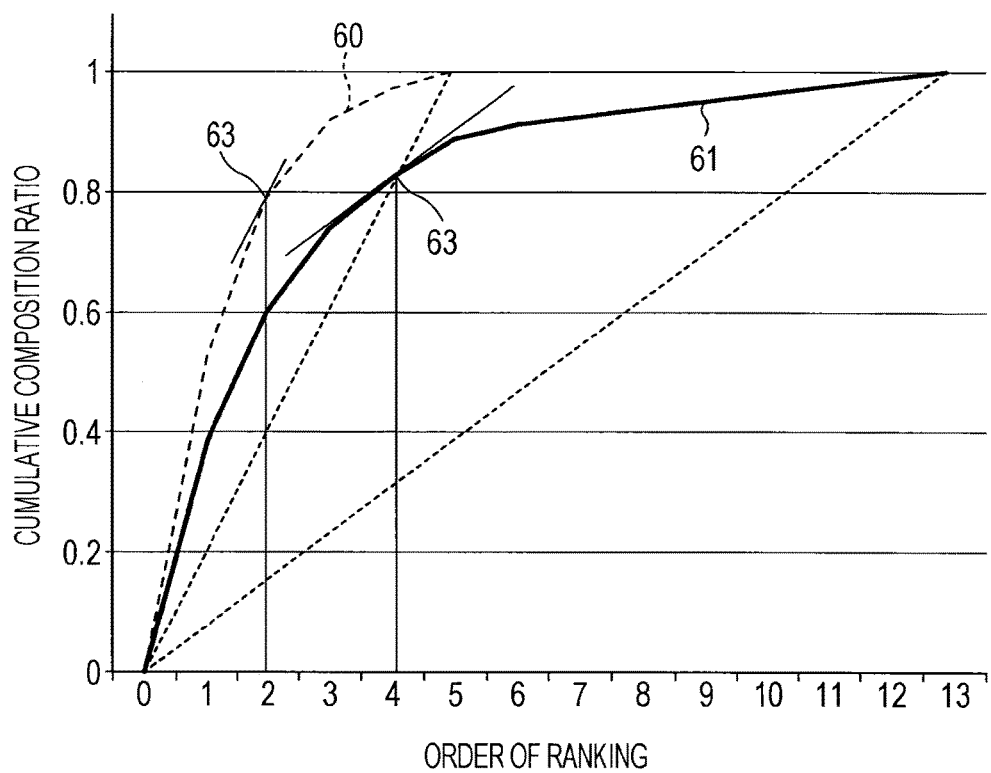
FIG. 7 is a graph illustrating an example of cumulative composition ratio curves obtained when the number of correct answers differs.

The number of disaster occurrence places differs depending on the size of a disaster occurrence place. However, according to this embodiment, a disaster occurrence place may be estimated with high accuracy by obtaining a change point of a cumulative composition ratio curve. A cumulative composition ratio curve is a combination of correct answer and noise components. Therefore, when the number of disaster occurrence places is large, a cumulative composition ratio curve is moderate and the position of the inflection point is shifted. FIG. 7 is a graph illustrating an example of cumulative composition ratio curves obtained when the number of correct answers differs. In the example of FIG. 7, a cumulative composition ratio curve 60 when the number of occurrence places of correct answers where a disaster has actually occurred is two and a cumulative composition ratio curve 61 when the number of the occurrence places of correct answers is four are illustrated. The cumulative composition ratio curve 61 changes more moderately, as compared to the cumulative composition ratio curve 60, and a change point 63 is shifted from the position of the second rank to the position of the fourth rank.

Figure 8:
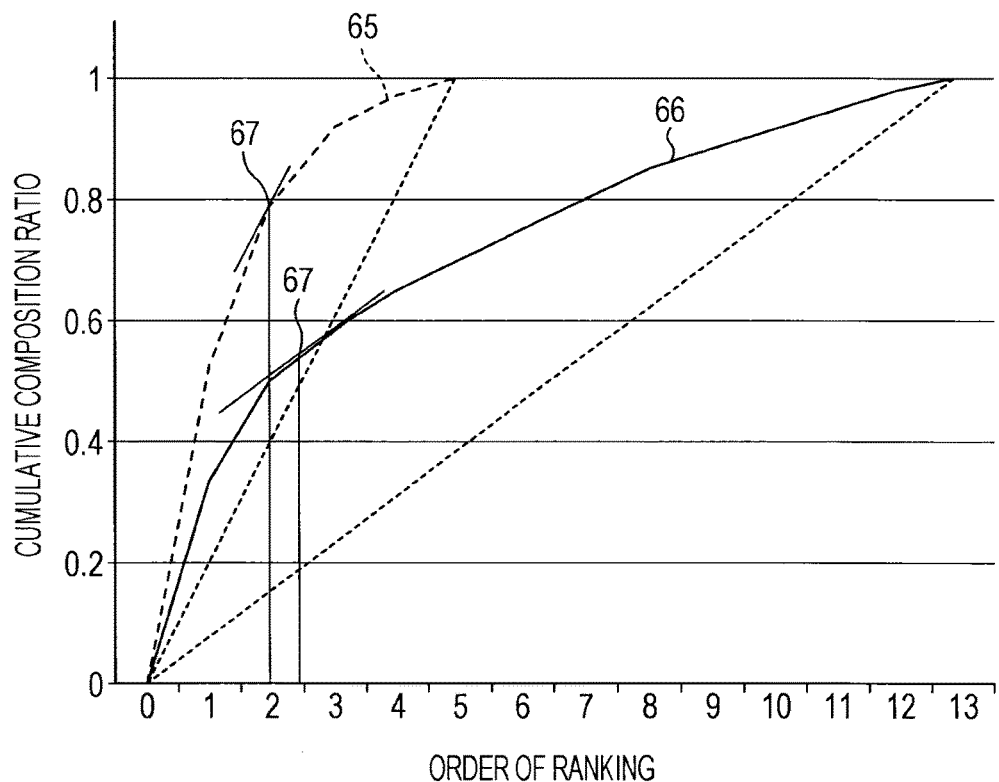
FIG. 8 is a graph illustrating an example of cumulative composition ratio curves obtained when a noise amount differs.

In the social media service 12, a noise amount of a message changes. However, according to this embodiment, a disaster occurrence place may be estimated with high accuracy by obtaining a change point of a cumulative composition ratio curve. FIG. 8 is a graph illustrating an example of cumulative composition ratio curves obtained when a noise amount differs. In the example of FIG. 8, a cumulative composition ratio curve 65 when the noise amount is small and a cumulative composition ratio curve 66 when the noise amount is large are illustrated. Each of the cumulative composition ratio curves 65 and 66 is a combination of correct and noise components. The cumulative composition ratio curve 65 has a smaller noise amount than that of the cumulative composition ratio curve 66, the ratio of the correct answer component is large, and therefore, the cumulative composition ratio curve 65 indicates a drastic increase. However, noise uniformly occurs, and therefore, for the cumulative composition ratio curves 65 and 66, the change point 67 substantially does not change.

Now, accuracy of estimation will be described with reference to comparative examples. Accuracy of estimation of a disaster occurrence place when a predetermined number of the top ranking disaster occurrence places are extracted as disaster occurrence places and accuracy of estimation of a disaster occurrence place when disaster occurrence places for which a cumulative composition ratio is up to a predetermined value are extracted will be described.

Figure 9A:
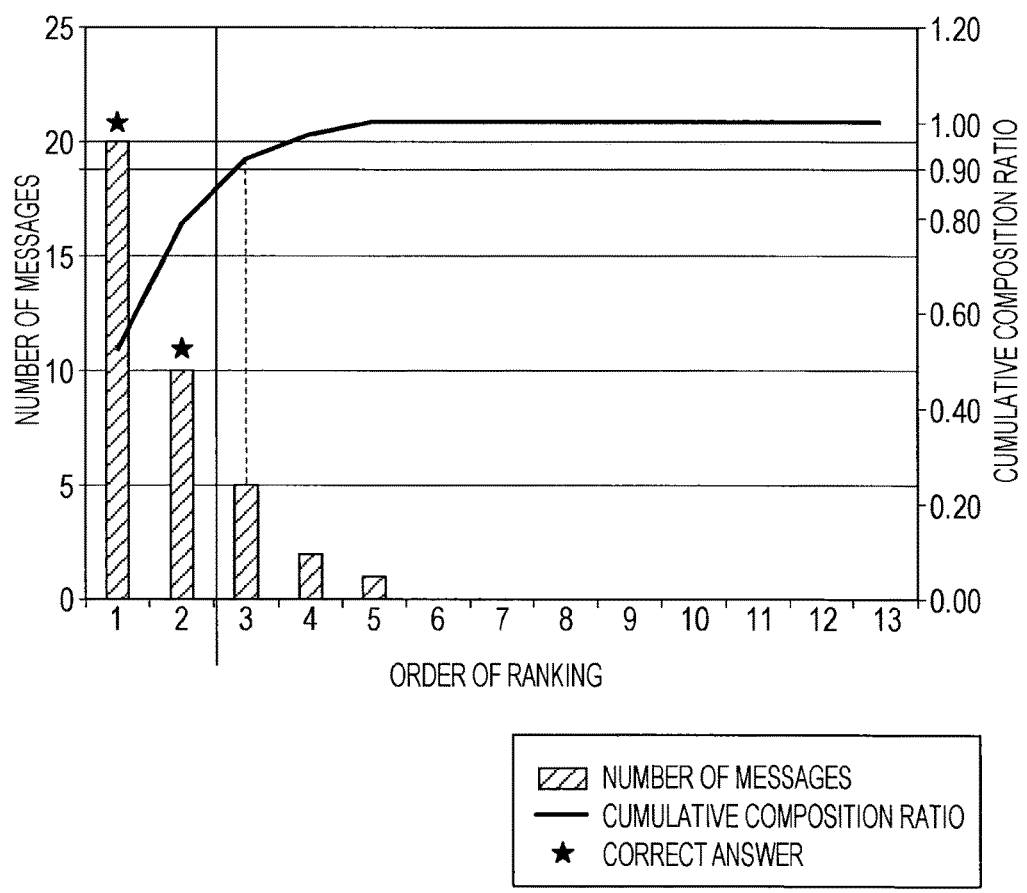
FIG. 9A is a graph illustrating a comparison example.

FIG. 9A is a graph illustrating a comparison example. In the example of FIG. 9A, it is assumed that the first and second ranks are correct answers. In the example of FIG. 9A, when the disaster occurrence places of the top two ranks are extracted as disaster occurrence places, and when the disaster occurrence places for which the cumulative composition ratio is up to 90% (0.90) are extracted, a disaster occurrence place of a correct answer may be extracted.

However, when the disaster occurrence places of the top two ranks are extracted as disaster occurrence places, the disaster occurrence range is large, and thus, when the number of correct answers increases, all of disaster occurrence places may not be extracted.

Figure 9B:
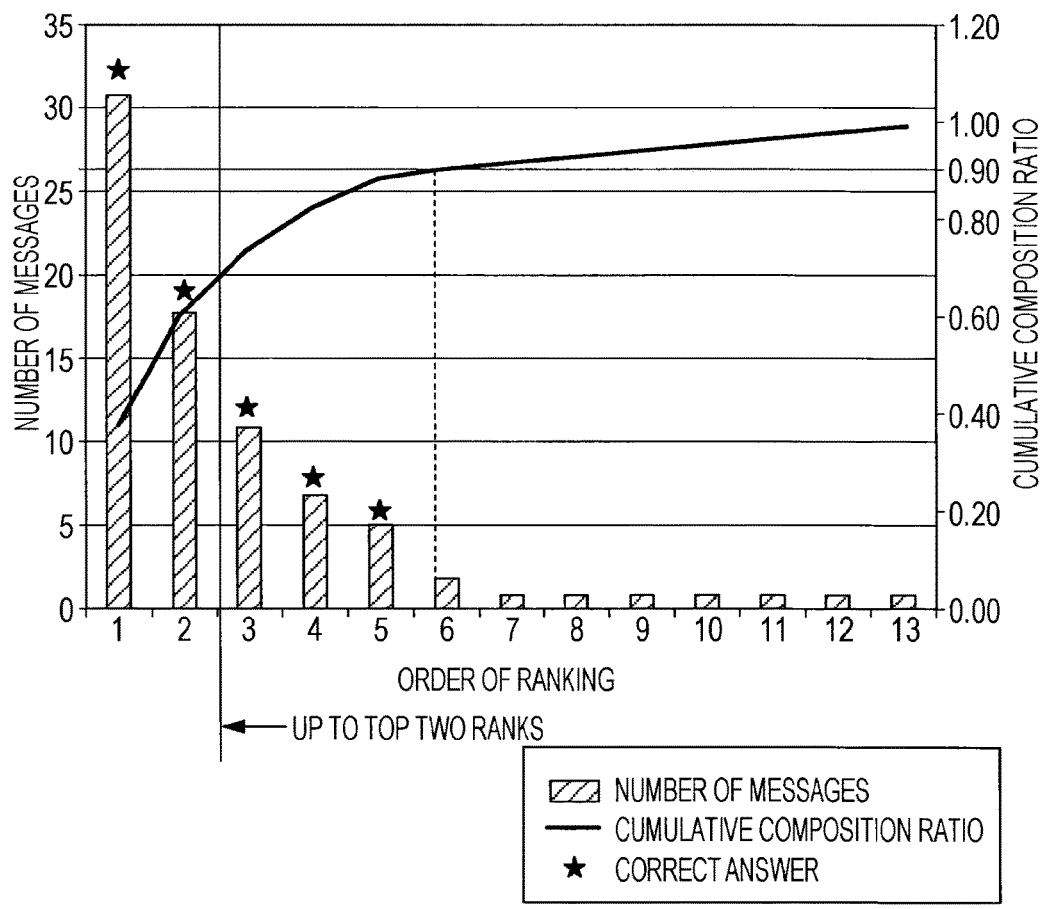
FIG. 9B is a graph illustrating a comparison example.

FIG. 9B is a graph illustrating a comparison example. In the example of FIG. 9B, it is assumed that the first to fifth ranks are correct answers. In the example of FIG. 9B, when the disaster occurrence places of the top two ranks are extracted as disaster occurrence places, the occurrence places of the third to fifth ranks are not extracted. Note that, in the example of FIG. 9B, when the occurrence places for which the cumulative composition ratio is up to 90% (0.90) are extracted, the occurrence places of the first to fifth ranks, which are correct answers, may be extracted.

On the other hand, when the disaster occurrence places for which the cumulative composition ratio is up to 90% (0.90) are extracted, with an increased noise amount, there might be cases where a place where a disaster has not actually occurred is extracted.

Figure 9C:
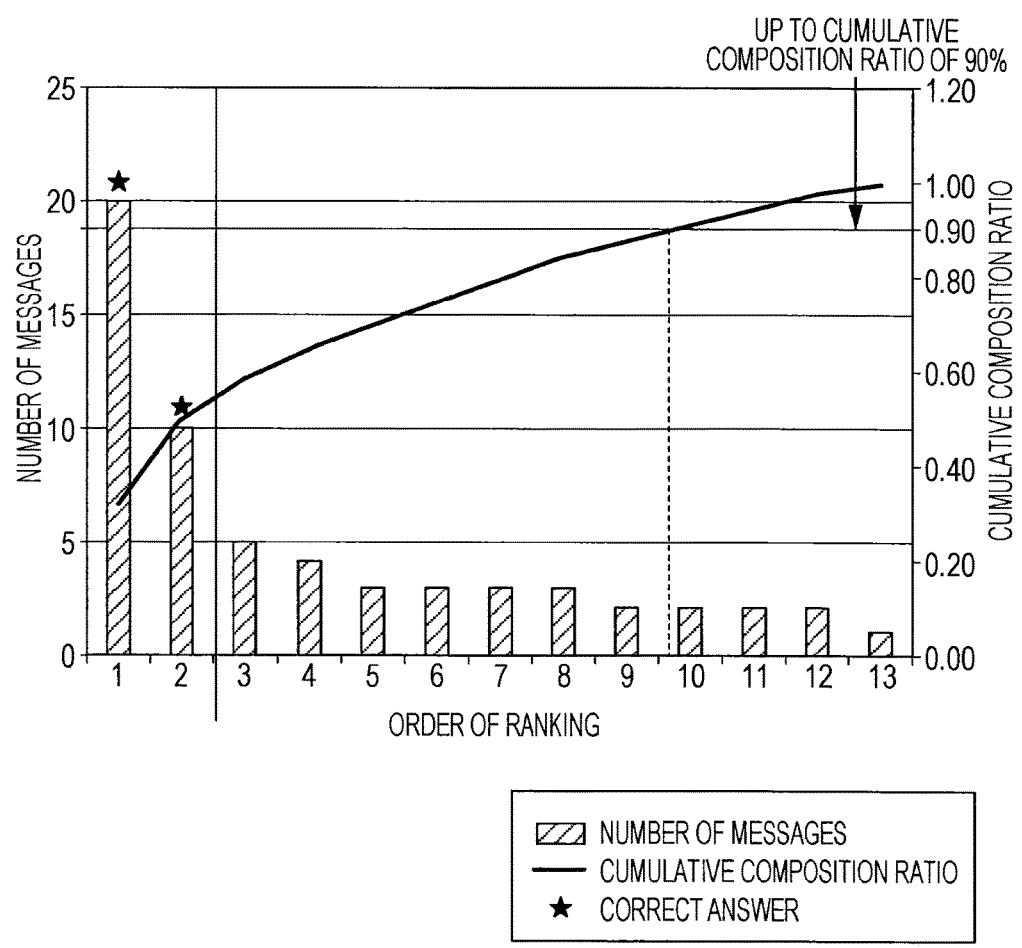
FIG. 9C is a graph illustrating a comparison example.

FIG. 9C is a graph illustrating a comparison example. In the example of FIG. 9C, it is assumed that the first and second ranks are correct answers. In the example of FIG. 9C, when the disaster occurrence places for which the cumulative composition ratio is up to 90% (0.90) are extracted, the occurrence places of the first to ninth ranks are extracted. Note that, in the example of FIG. 9C, when the disaster occurrence places of the top two ranks are extracted as disaster occurrence places, the occurrence places of the first and second ranks, which are correct answers, may be extracted.

As described above, when disaster occurrence places of a predetermined number of the top ranks are extracted as disaster occurrence places, and when disaster occurrence places for which the cumulative composition ratio is up to a predetermined value are extracted, there are cases where a disaster occurrence place is not estimated with high accuracy. On the other hand, as described with reference to FIGS. 6 to 8, even when the number of occurrence places of correct answers changes or when the noise amount is large, the event occurrence place estimation apparatus 11 according to this embodiment may estimate a disaster occurrence place with high accuracy.

Next, an example of actual estimation of a disaster occurrence place will be described. First, a result of estimation based on data of messages related to flooding and submerging that occurred in Osaka Prefecture on Aug. 18, 2012, which were posted to twitter, will be described. FIG. 10A is a table illustrating an example of results of ranking of flooding and submerging occurrence places, which were extracted from messages, in descending order of the number of messages. In FIG. 10A, occurrence places where flooding and submerging actually occurred are illustrated as correct answers. The occurrence places where flooding and submerging actually occurred were identified based on news reports of newspaper of that day, and the like. The example of FIG. 10A indicates that flooding and submerging actually occurred in "Osaka City_Osaka Prefecture" of the first rank and "Takatsuki City_Osaka Prefecture" of the second rank.

Figure 10B:
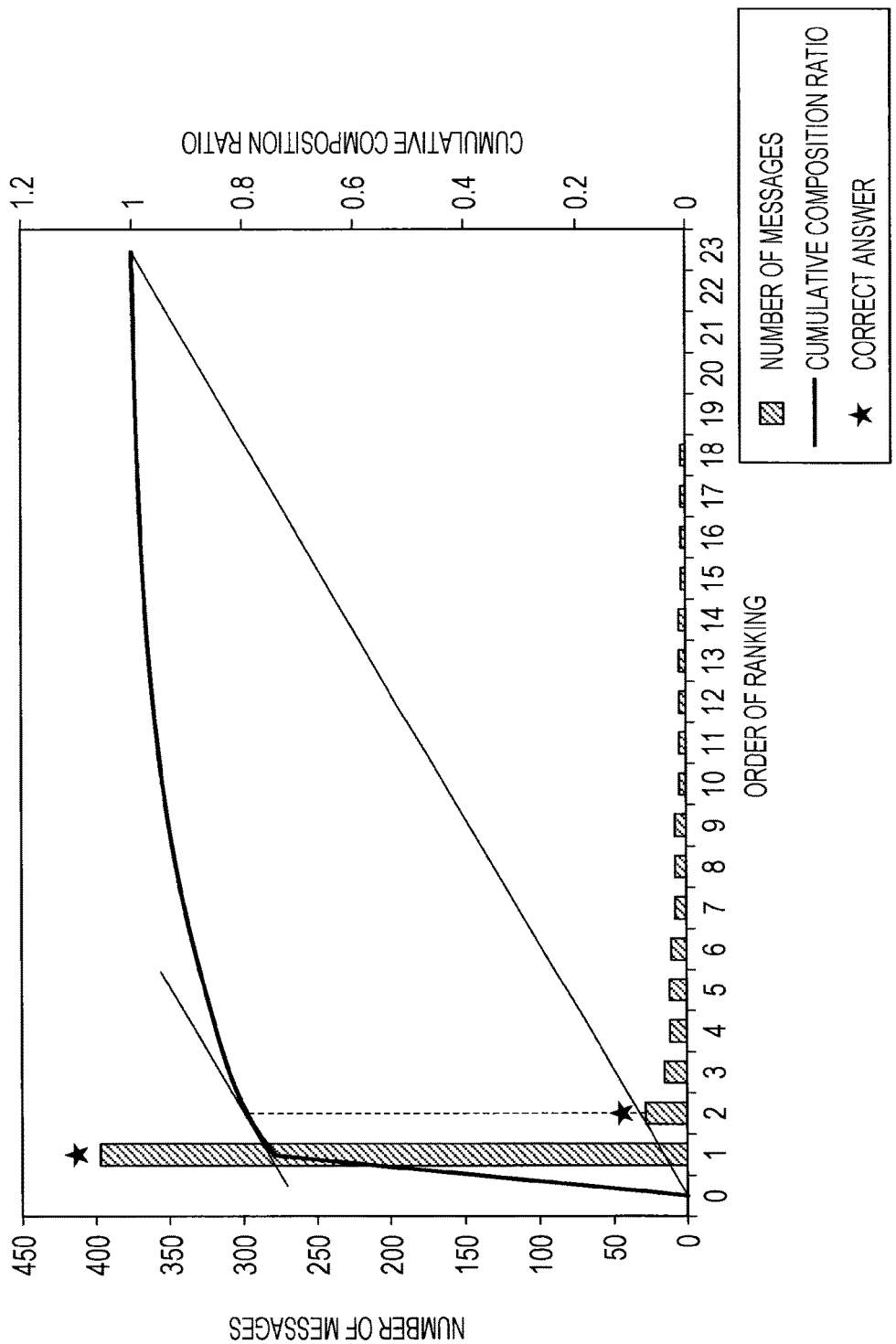
FIG. 10B is a graph illustrating the number of messages of each occurrence place and an example of a cumulative composition ratio curve.

FIG. 10B is a graph illustrating the number of messages of each occurrence place and an example of a cumulative composition ratio curve. In FIG. 10B, star signs are illustrated as correct answers on parts of the graph, which indicate the occurrence places of the first and second ranks where flooding and submerging actually occurred. In the example of FIG. 10B, the position of a change point of a cumulative composition ratio curve is the position of the second rank. For example, as illustrated in FIG. 10A, the output section 39 outputs each occurrence place to the display section 21 in ranking order, and outputs occurrence places ranked higher than the position of the change point to the display section 21 such that the occurrence places ranked higher than the position of the change point may be identified by star signs. The event occurrence place estimation apparatus 11 outputs a result in the above-described manner, and thus, a user who referred to the result is able to correspond and distinguish each occurrence place included in a message and an occurrence place where it is presumed that event has occurred from each other, so that credibility of the output result may be increased. Note that a display format of displaying an output result, which enables identification, is not limited thereto, but may be, for example, any format that enables identification of an occurrence place ranked higher than the position of a change point by, for example, changing a color, changing a pattern, or separating a display position.

FIG. 10C is a table illustrating an example of evaluation results for accuracy of estimation of flooding and submerging occurrence places. The accuracy is the ratio of correct answers to occurrence places output as occurrence places of flooding and submerging. Accuracy is calculated, for example, based on (the number of correct answers among output occurrence places)/(the number of the output occurrence places). A recall ratio is the ratio at which occurrence places of correct answers were output. The recall ratio is calculated, for example, based on (the number of correct answers among output occurrence places)/(the total number of correct answers). An F value is the ratio indicating how well correct answers have been output among output occurrence places. The F value is calculated, for example, based on 2×accuracy×the recall ratio/(accuracy+the recall ratio). The event occurrence place estimation apparatus 11 outputs the disaster occurrence places of the first and second, and therefore, as illustrated in FIG. 10C, the accuracy is 1.00, the recall ratio is 1.00, and the F value is 1.00. Also, in FIG. 10C, a case where the disaster occurrence places of up to the fifth rank are extracted as disaster occurrence places and a case where the disaster occurrence places for which the cumulative composition ratio is up to 80% are extracted are illustrated for reference. When the disaster occurrence places of up to the fifth rank are extracted as disaster occurrence places, the occurrence places of the third and fifth ranks where flooding and submerging have not occurred are output as disaster occurrence places, and therefore, the accuracy is 0.40, the recall ratio is 1.00, and the F value is 0.57. When the disaster occurrence places for which the cumulative composition ratio is up to 80% are extracted, the disaster occurrence places of the first and second ranks are output as disaster occurrence places, and therefore, the accuracy is 1.00, the recall ratio is 1.00, and the F value is 1.00.

Next, a result of estimation based on data of messages related to flooding and submerging that occurred in Osaka Prefecture on Aug. 14, 2012, which were posted to Twitter, will be described. FIG. 11A is a table illustrating an example of results of ranking flooding and submerging occurrence places, which were extracted from messages, in descending order of the number of messages. Also, in FIG. 11A, occurrence places where flooding and submerging actually occurred are illustrated as correct answers. The occurrence places where flooding and submerging actually occurred were identified based on news reports of newspaper of that day, and the like. The example of FIG. 11A indicates that flooding and submerging actually occurred in "Osaka City_Osaka Prefecture" of the first rank, "Moriguchi City_Osaka Prefecture" of the second rank, "Neyagawa City_Osaka Prefecture" of the third rank, and "Takatsuki City_Osaka Prefecture" of the fifth rank. FIG. 11B is a graph illustrating the number of messages of each occurrence place and an example of a cumulative composition ratio curve. In the example of FIG. 11B, star signs are illustrated as correct answers on parts of the graph, which indicate the occurrence places of the first to third, and fifth ranks where flooding and submerging actually occurred. In the example of FIG. 11B, the position of a change point of a cumulative composition ratio curve is the position of the fifth rank. For example, as illustrated in FIG. 11A, the output section 39 outputs each occurrence place to the display section 21 in ranking order, and outputs occurrence places ranked higher than the position of the change point to the display section 21 such that the occurrence places ranked higher than the position of the change point may be identified by star signs.

FIG. 11C is a table illustrating an example of evaluation results for accuracy of estimation of flooding and submerging occurrence places. The event occurrence place estimation apparatus 11 outputs the disaster occurrence places of the first to fifth ranks as disaster occurrence places, and therefore, as illustrated in FIG. 11C, the accuracy is 0.80, the recall ratio is 1.00, and the F value is 0.88. Also, in FIG. 11C, a case where the disaster occurrence places of up to the fifth rank are extracted as disaster occurrence places and a case where the disaster occurrence places for which the cumulative composition ratio is up to 80% are extracted are illustrated for reference. When the disaster occurrence places of up to the fifth rank are extracted as disaster occurrence places, the occurrence places of the first to fifth ranks are output as disaster occurrence places, and therefore, the accuracy is 0.80, the recall ratio is 1.00, and the F value is 0.88. When the disaster occurrence places for which the cumulative composition ratio is up to 80% are extracted, the occurrence places of the first to seventh ranks are output as disaster occurrence places, and therefore, the accuracy is 0.57, the recall ratio is 1.00, and the F value is 0.72.

[Flow of Processing]

Figure 12:
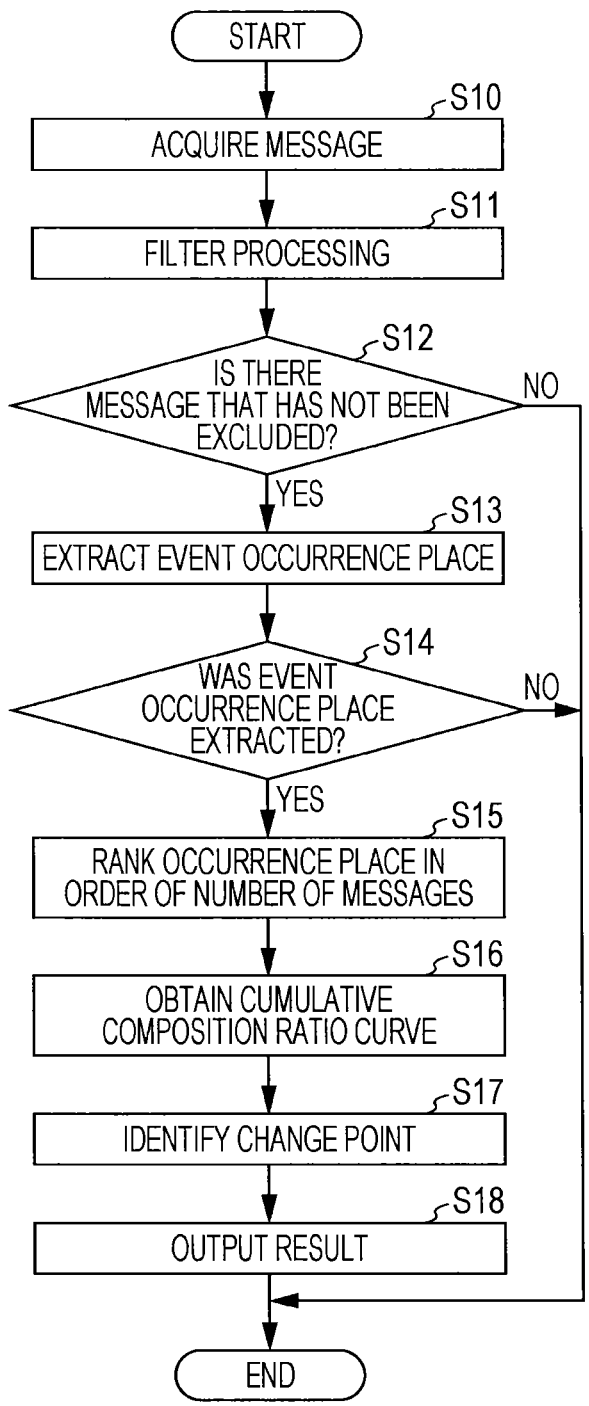
FIG. 12 is a flow chart illustrating an example of steps of output processing.

A flow of estimation processing where the event occurrence place estimation apparatus 11 according to this embodiment estimates an event occurrence place will be described. FIG. 12 is a flow chart illustrating an example of steps of estimation processing. The estimation processing is executed with a predetermined timing, for example, a timing with which a start of estimation is instructed by an input section 22. Note that the estimation processing may be regularly executed to regularly output an estimation result.

As illustrated in FIG. 12, the acquisition section 35 acquires a posted message from the social media service 12 (S10). The filter section 36 performs filter processing of excluding a message that is not used from acquired messages (S11). For example, the filter section 36 performs filter processing of excluding a message that does not include a keyword stored in the event information 30 from the acquired messages. Also, the filter section 36 performs filter processing of excluding a message posted by a media organization, a reposted message, and a presumptive message from the acquired messages.

The extraction section 37 determines whether or not there is a message that has not been excluded by filter processing (S12). When there is not the message (NO in S12), the process is ended. On the other hand, when there is the message (YES in S12), the extraction section 37 extracts information of an event occurrence place from the remaining messages that have not been excluded by filter processing (S13).

The identification section 38 determines whether or not information of an event occurrence place was extracted (S14). When information of an event occurrence place was not extracted (NO in S14), the process is ended. On the other hand, when information of an event occurrence place was extracted (YES in S14), the identification section 38 ranks extracted occurrence places in descending order of the number of messages (S15). The identification section 38 cumulates the number of messages of each occurrence place in ranking order, and obtains a cumulative composition ratio curve for all of messages from which event occurrence places were extracted (S16). The identification section 38 identifies a change point where the change rate of the cumulative composition ratio curve is an average increase rate of the cumulative composition ratio curve (S17).

The output section 39 outputs an occurrence place, based on the identified change point (S18), and the process is ended. For example, the output section 39 outputs each occurrence place to the display section 21 in ranking order, and outputs an occurrence place ranked higher than the position of the change point to the display section 21 such that the occurrence place ranked higher than the position of the change point may be identified.

[Advantages]

As described above, the event occurrence place estimation apparatus 11 according to this embodiment acquires a message related to a predetermined event from the social media service 12 to which a message is posted. The event occurrence place estimation apparatus 11 extracts an event occurrence place from the acquired message. The event occurrence place estimation apparatus 11 ranks extracted occurrence places in descending order of the number of messages. The event occurrence place estimation apparatus 11 cumulates the number of messages of each occurrence place in ranking order, and identifies a change point where the increase rate of the cumulated number of messages is an average increase rate. For example, the event occurrence place estimation apparatus 11 cumulates the number of messages of each occurrence place in ranking order and obtains a cumulative composition ratio curve for all of messages. The event occurrence place estimation apparatus 11 identifies a change point where the change rate of the cumulative composition ratio curve is an average increase rate of the cumulative composition ratio curve. The event occurrence place estimation apparatus 11 outputs an occurrence place, based on the identified change point. Thus, the event occurrence place estimation apparatus 11 may estimate an event occurrence place with high accuracy.

Also, the event occurrence place estimation apparatus 11 according to this embodiment outputs an occurrence place ranked higher than the position of the identified change point in a cumulative composition ratio curve. Thus, the event occurrence place estimation apparatus 11 may estimate an event occurrence place with high accuracy regardless of the number of event occurrence places and the noise amount.

Also, the event occurrence place estimation apparatus 11 according to this embodiment excludes one or more of a message posted by a media organization, a reposted message, and a presumptive message from acquired messages. Thus, the event occurrence place estimation apparatus 11 may extract a message based on witnessing of each user, and therefore, may estimate an event occurrence place where many user witnessed the occurrence of an event with high accuracy.

Also, the event occurrence place estimation apparatus 11 according to this embodiment outputs each occurrence place in ranking order, and outputs occurrence places ranked higher than the position of the change point such that the occurrence places ranked higher than the position of the change point may be identified. Thus, with the event occurrence place estimation apparatus 11, a user is able to comprehend and distinguish each occurrence place included in a message and an occurrence place where it is presumed that event has occurred from each other, so that credibility of the output result may be increased.

Second Embodiment

An embodiment related to an apparatus according to the present disclosure has been described above, but a technique disclosed herein may be implemented by not only the embodiment described above but also various different embodiments. Therefore, another embodiment of the present disclosure will be described below.

For example, in the above-described embodiment, a case where, in the event occurrence place estimation apparatus 11, a result is output to the display section 21 has been described, but an apparatus according to the present disclosure is not limited thereto. For example, the event occurrence place estimation apparatus 11 may output a result to a terminal device connected thereto via the network 13. Also, the event occurrence place estimation apparatus 11 may output a signal that urges a warning for an estimated occurrence place. Also, the event occurrence place estimation apparatus 11 may output an e-mail, or the like, to an administrator of disaster management of an estimated occurrence place.

Also, in the above-described embodiment, a case where a flooding disaster occurrence place is estimated as an event occurrence place from a message has been described, but an apparatus according to the present disclosure is not limited thereto. For example, an apparatus according to the present disclosure may be used, for example, for estimating an occurrence place of some other disaster. Also, an event is not limited to a disaster. An event may be any event related to a place. For example, a place where cherry blossoms came into bloom, a place where pollens badly scatter, or the like, may be estimated from a message.

Also, each component element of each unit illustrated in the drawings is function conceptual and may not be physically configured as illustrated in the drawings. That is, specific embodiments of disintegration and integration of each unit are not limited to those illustrated in the drawings, and all or some of the units may be disintegrated/integrated functionally or physically in an arbitrary unit in accordance with various loads, use conditions, and the like. For example, respective processing sections of the acquisition section 35, the filter section 36, the extraction section 37, the identification section 38, and the output section 39 may be integrated, as appropriate. Also, processing of each processing section may be divided to processes of a plurality of processing sections, as appropriate. Furthermore, the whole or a part of each processing function performed by each processing section may be realized by a CPU and a program that is analyzed and executed by the CPU, or may be realized as a hardware of a wired logic.

[Event Occurrence Place Estimation Program]

Figure 13:
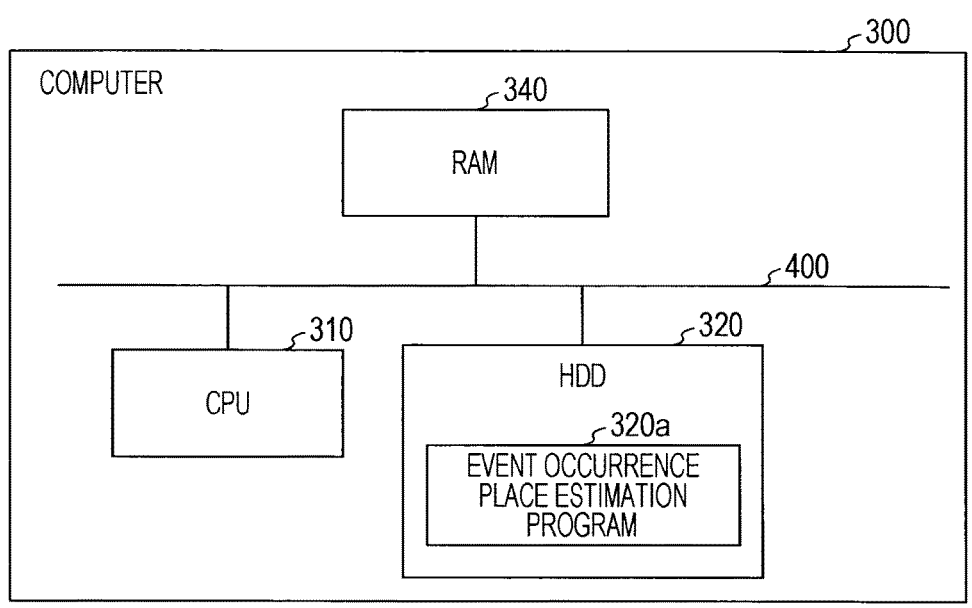
FIG. 13 is a diagram illustrating a computer that executes an event occurrence place estimation program.

Various types processing described in the above-described embodiment may be realized by causing a computer system, such as a personal computer, a work station, and the like, to execute a program prepared in advance. An example of a computer system that executes a program having the same function as that of the above-described embodiment will be described. FIG. 13 is a diagram illustrating a computer that executes an event occurrence place estimation program.

As illustrated in FIG. 13, a computer 300 includes a central processing unit (CPU) 310, a hard disk drive (HDD) 320, and a random access memory (RAM) 340. The computer 300, CPU 310, HDD 320, and RAM 340 are connected to each other via a bus 400.

An event occurrence place estimation program 320a that exercises similar functions to those of the acquisition section 35, the filter section 36, the extraction section 37, the identification section 38, and the output section 39 is stored in HDD 320 in advance. Note that the event occurrence place estimation program 320a may be divided, as appropriate.

HDD 320 stores various types of information. For example, HDD 320 stores OS and various types of data used for production planning.

CPU 310 executes a similar operation to that of each processing section of the above-described embodiment by reading out the event occurrence place estimation program 320a from HDD 320 to execute the program 320a. That is, the event occurrence place estimation program 320a executes similar operations to those of the acquisition section 35, the filter section 36, the extraction section 37, the identification section 38, and the output section 39.

Note that there may be cases where the above-described event occurrence place estimation program 320a is not initially stored in HDD 320.

For example, a program is stored in a "portable physical medium", such as a flexible disk (FD), a CD-ROM, a DVD disk, a magneto-optical disk, an IC card, and the like, which is inserted to the computer 300, in advance. The computer 300 may be configured to read out the program from the portable physical medium and execute the program.

Furthermore, a program is stored in "another computer (or a server)", or the like, connected to the computer 300 via a public line, the Internet, a LAN, a WAN, or the like, in advance. The computer 300 may be configured to read out the program from the another computer (or the server), or the like, and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An event occurrence place estimation method having a process executed by a computer, the process comprising:
   acquiring a plurality of messages related to a disaster from social media to which the plurality of messages are posted;
   extracting a piece of occurrence place information indicating a plurality of occurrence places of the disaster from the acquired plurality of messages;
   specifying, among from the plurality of messages, a first message which includes information indicating that the first message is reposted in the social media;
   excluding the specified first message from the plurality of messages;
   after the excluding of the specified first message, ranking the occurrence places in descending order according to the number of messages corresponding to each of the occurrence places,
   cumulating, for each of the occurrence places, the number of messages associated with the respective occurrence places to acquire a cumulative composition ratio curve indicating a ratio of the number of messages associated with the respective occurrence places to all of the number of the messages; and
   detecting one or more locations effected by the disaster, the detecting including
      identifying, on the cumulative composition ratio curve, a change point where a change rate of the cumulative composition ratio curve becomes similar to an average increase ratio of the cumulative composition ratio curve; and
      outputting, on a displayed image, one or more first occurrence places ranked at or higher than the change point of the cumulative composition ratio curve with distinguishing one or more second occurrence places ranked lower than the change point to cause a user to recognize the one or more first occurrence places as the one or more locations effected by the disaster.

2. The event occurrence place estimation method having a process executed by a computer according to claim 1,
   wherein, in the identifying, the number of messages associated with the respective occurrence places is cumulated in ranking order to obtain the cumulative composition ratio curve, and the change point is identified using the cumulative composition ratio curve.

3. The event occurrence place estimation method having a process executed by a computer according to claim 1,
   wherein, in the distinguishing, the one or more first occurrence places are distinguished on the displayed image by at least one of a character, a color, a pattern, and separation from the second one or more first occurrence places.

4. The event occurrence place estimation method having a process executed by a computer according to claim 1,
   wherein the computer further executes excluding one or more of a message posted by a media organization, a reposted message, and a presumptive message from the plurality of messages, and
   in the extracting, the piece of occurrence place information indicating the occurrence places is extracted from remaining messages after the excluding.

5. The event occurrence place estimation method having a process executed by a computer according to claim 1,
   further comprising displaying on the displayed image the number of messages for the one or more first occurrence places on the plot.

6. The event occurrence place estimation method having a process executed by a computer according to claim 1, the method further comprising:
   performing machine learning of a specific word indicating a presumptive content;
   specifying, among from the plurality of messages, a second message which includes the specific word which indicates the second message includes the presumptive content; and
   excluding the specified second message from the plurality of messages;
   wherein, after the excluding of the specified second message, the ranking of the occurrence places is executed.

7. A computer-readable hardware storage medium storing an event occurrence place estimation program for causing a computer to execute a process, the process comprising:
   acquiring a plurality of messages related to a disaster from social media to which the plurality of messages are posted;
   extracting a piece of occurrence place information indicating a plurality of occurrence places of the disaster from the acquired plurality of messages;
   specifying, among from the plurality of messages, a first message which includes information indicating that the first message is reposted in the social media;
   excluding the specified first message from the plurality of messages;
   after the excluding of the specified first message, ranking the occurrence places in descending order according to the number of messages corresponding to each of the occurrence places,
   cumulating, for each of the occurrence places, the number of messages associated with the respective occurrence places to acquire a cumulative composition ratio curve indicating a ratio of the number of messages associated with the respective occurrence places to all of the number of the messages; and
   detecting one or more locations effected by the disaster, the detecting including
      identifying, on the cumulative composition ratio curve, a change point where a change rate of the cumulative composition ratio curve becomes similar to an average increase ratio of the cumulative composition ratio curve; and
      outputting, on a displayed image, one or more first occurrence places ranked at or higher than the change point of the cumulative composition ratio curve with distinguishing one or more second occurrence places ranked lower than the change point to cause a user to recognize the one or more first occurrence places as the one or more locations effected by the disaster.

8. The computer-readable hardware storage medium according to claim 7, the process further comprising:
performing machine learning of a specific word indicating a presumptive content;
specifying, among from the plurality of messages, a second message which includes the specific word which indicates the second message includes the presumptive content; and
excluding the specified second message from the plurality of messages;
wherein, after the excluding of the specified second message, the ranking of the occurrence places is executed.

9. An event occurrence place estimation apparatus comprising:
a hardware processor configured to
acquire a plurality of messages related to a disaster from social media to which the plurality of messages are posted;
extract a piece of occurrence place information indicating a plurality of occurrence places of the disaster from the acquired plurality of messages;
specify, among from the plurality of messages, a first message which includes information indicating that the first message is reposted in the social media,
exclude the specified first message from the plurality of messages,
after the specified first message is excluded from the plurality of messages, rank the occurrence places in descending order according to the number of messages corresponding to each of the occurrence places, cumulate, the number of messages associated with the respective occurrence places to acquire a cumulative composition ratio curve indicating a ratio of the number of messages associated with the respective occurrence places to all of the number of the messages; and
detect one or more locations effected by the disaster, including
identify, on the cumulative composition ratio curve, a change point where a change rate of the cumulative composition ratio curve becomes similar to an average increase ratio of the cumulative composition ratio curve; and
output, on a displayed image, one or more first occurrence places ranked at or higher than the change point of the cumulative composition ratio curve with distinguishing one or more second occurrence places ranked lower than the change point to cause a user to recognize the one or more first occurrence places as the one or more locations effected by the disaster.

10. The event occurrence place estimation apparatus according to claim 9, wherein the hardware processor is further configured to:
perform machine learning of a specific word indicating a presumptive content,
specify, among from the plurality of messages, a second message which includes the specific word which indicates the second message includes the presumptive content, and
exclude the specified second message from the plurality of messages,
wherein, after the specified second message is excluded from the plurality of messages, the ranking of the occurrence places is executed.

* * * * *